(12) United States Patent
Jung et al.

(10) Patent No.: US 10,609,695 B2
(45) Date of Patent: Mar. 31, 2020

(54) METHOD AND APPARATUS FOR ALLOCATING RESOURCES FOR MULTIPLE USERS IN WIRELESS LAN SYSTEM

(71) Applicant: Samsung Electronics Co., Ltd., Suwon-si, Gyeonggi-do (KR)

(72) Inventors: Sungkyu Jung, Seongnam-si (KR); Jongho Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,779

(22) PCT Filed: Apr. 18, 2016

(86) PCT No.: PCT/KR2016/003991
§ 371 (c)(1),
(2) Date: Oct. 11, 2017

(87) PCT Pub. No.: WO2016/167621
PCT Pub. Date: Oct. 20, 2016

(65) Prior Publication Data
US 2018/0124750 A1    May 3, 2018

(30) Foreign Application Priority Data

Apr. 16, 2015 (KR) .................. 10-2015-0054005

(51) Int. Cl.
*H04W 72/04* (2009.01)
*H04L 5/00* (2006.01)
*H04W 84/12* (2009.01)

(52) U.S. Cl.
CPC .......... *H04W 72/042* (2013.01); *H04L 5/005* (2013.01); *H04L 5/0037* (2013.01);
(Continued)

(58) Field of Classification Search
CPC .. H04W 72/042; H04W 84/12; H04L 5/0037; H04L 5/005; H04L 5/0053; H04L 5/0007
See application file for complete search history.

(56) References Cited

U.S. PATENT DOCUMENTS

2013/0286959 A1   10/2013   Lou et al.
2014/0211775 A1   7/2014    Sampath et al.
(Continued)

OTHER PUBLICATIONS

NEWRACOM, SIG Field Design Principle for 11ax, IEEE 802.11-15/0344r2, Mar. 12, 2015.

*Primary Examiner* — Luat Phung
(74) *Attorney, Agent, or Firm* — Jefferson IP Law, LLP

(57) ABSTRACT

The present disclosure relates to technologies for sensor networks, machine-to-machine (M2M) communication, machine-type communication (MTC), and the Internet of Things (IoT). The present disclosure may be used for intelligent services based on these technologies (smart homes, smart buildings, smart cities, smart or connected cars, healthcare, digital education, retail business, security and safety, and the like). For sending a payload to multiple users through OFDMA in a wireless LAN system, it is difficult to efficiently allocate resources for OFDMA by using the resource allocation configuration of the existing PPDU. Hence, there is proposed a new PPDU including a first field and a second field.

11 Claims, 18 Drawing Sheets

(52) U.S. Cl.
CPC .......... *H04L 5/0053* (2013.01); *H04L 5/0007* (2013.01); *H04W 84/12* (2013.01)

(56) References Cited

U.S. PATENT DOCUMENTS

| | | |
|---|---|---|
| 2014/0369276 A1 | 12/2014 | Porat et al. |
| 2015/0009894 A1 | 1/2015 | Vermani et al. |
| 2016/0081090 A1 | 3/2016 | Jung et al. |
| 2016/0212247 A1* | 7/2016 | Azizi .................. H04L 27/2613 |
| 2017/0280462 A1* | 9/2017 | Chun ........................ H04L 1/00 |
| 2018/0091347 A1* | 3/2018 | Lee ....................... H04L 5/0048 |

* cited by examiner

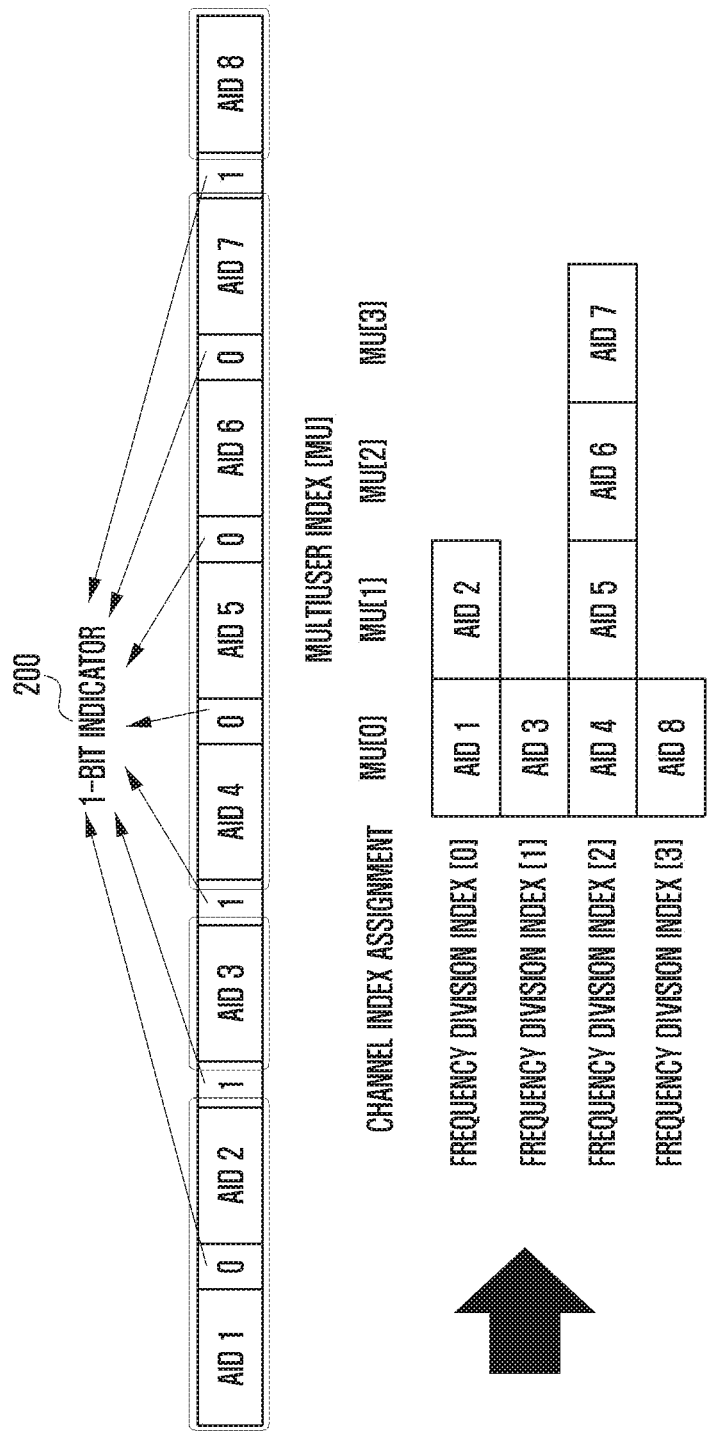

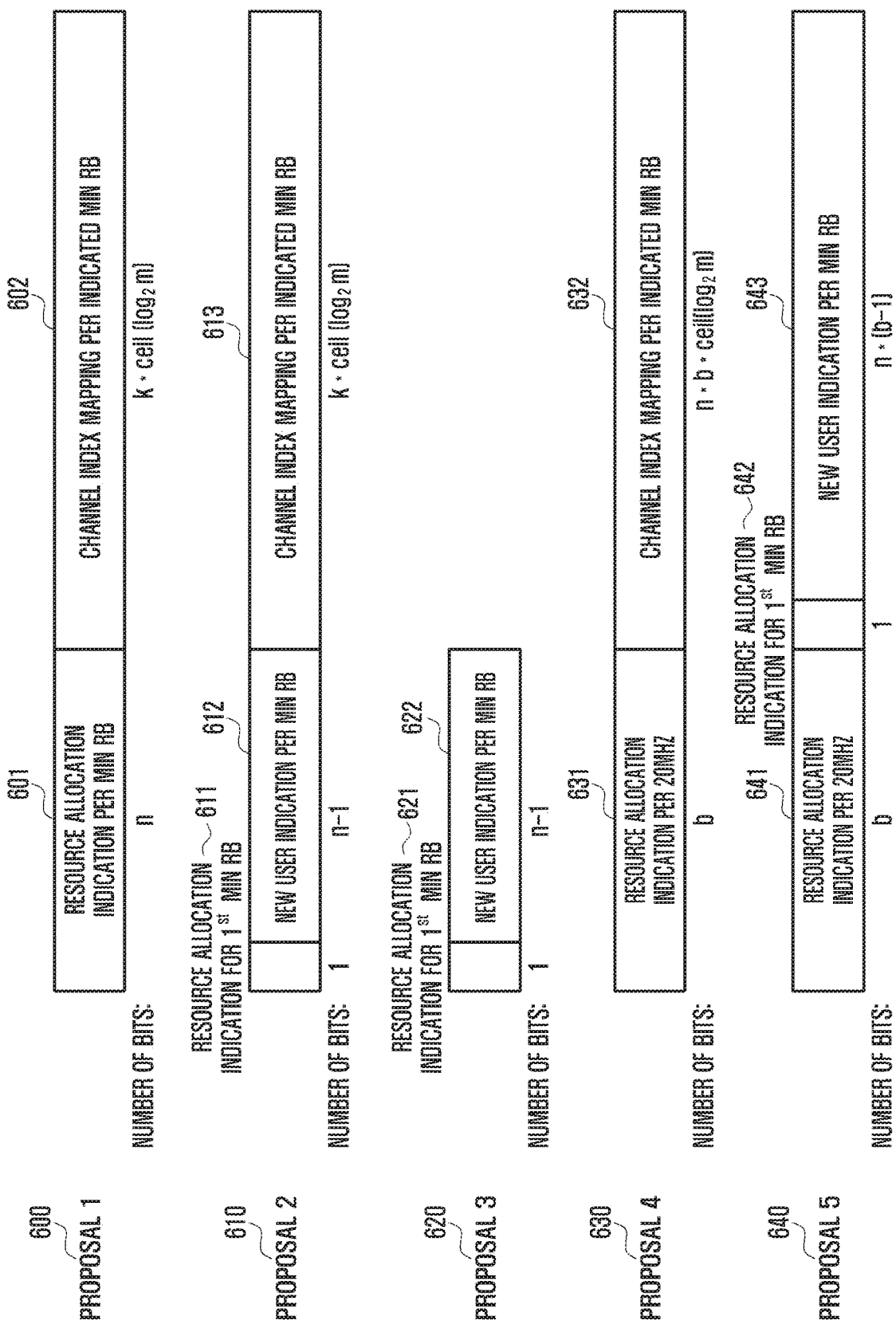

FIG. 7
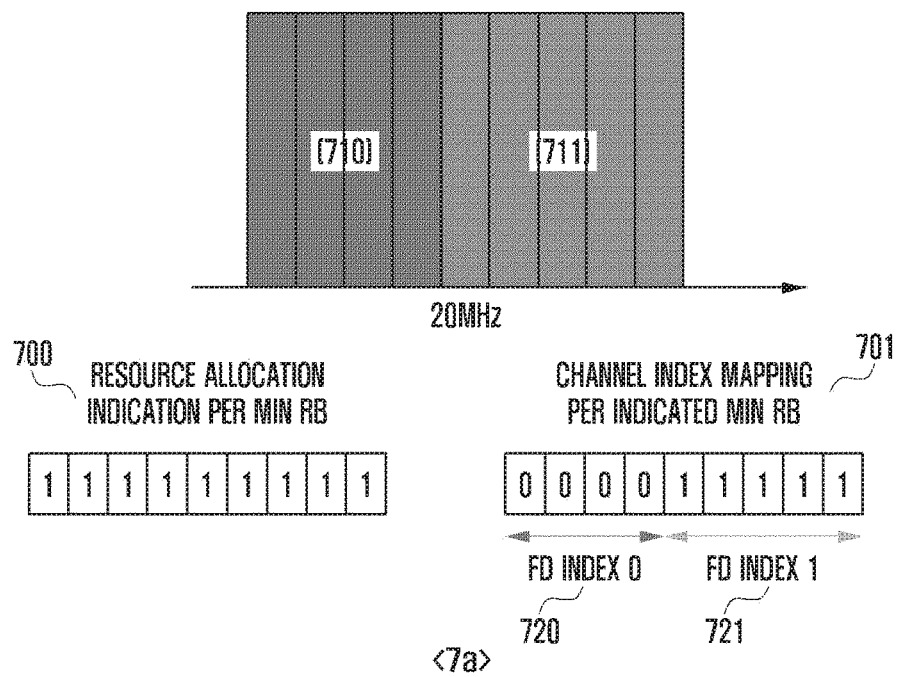
<7a>
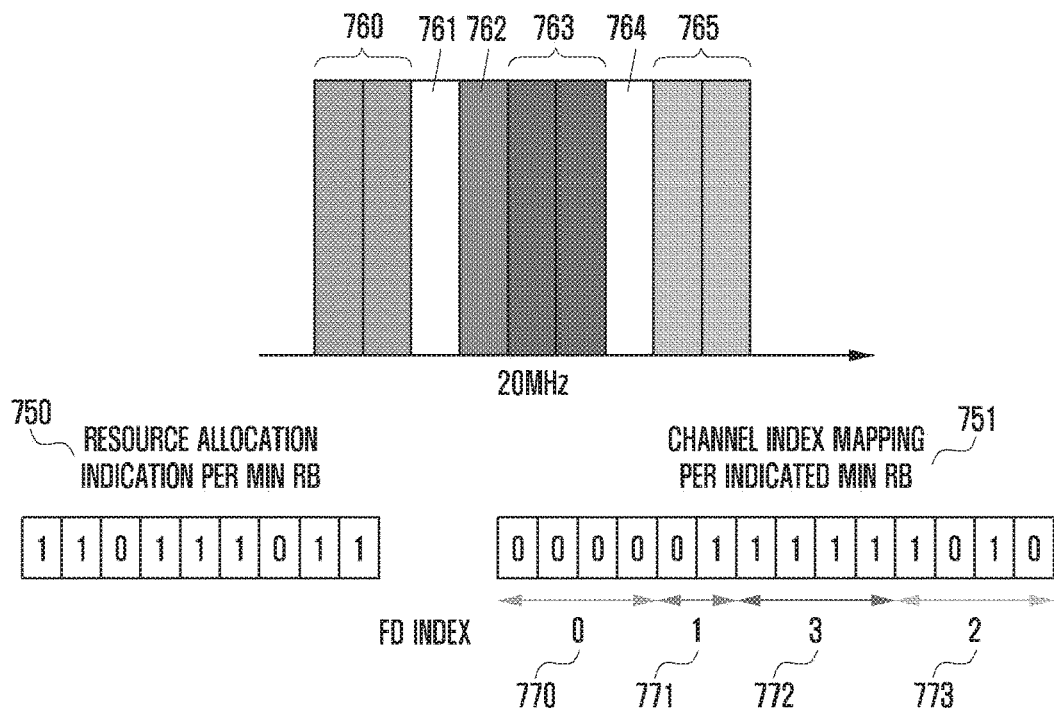
<7b>

FIG. 8
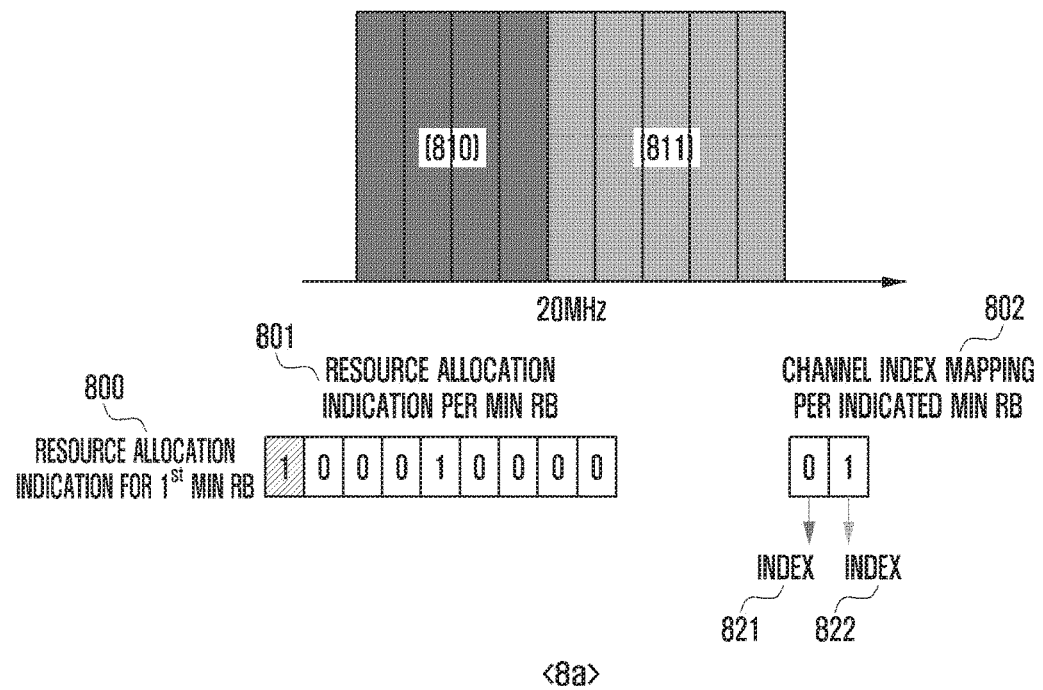
<8a>
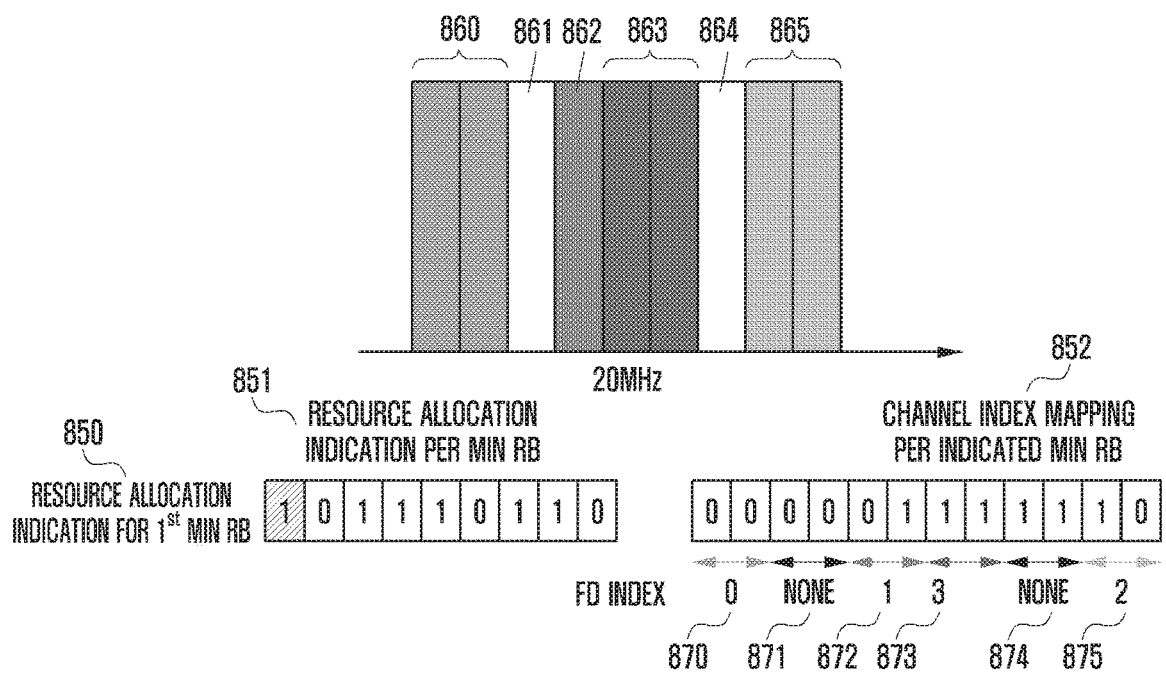
<8b>

FIG. 9
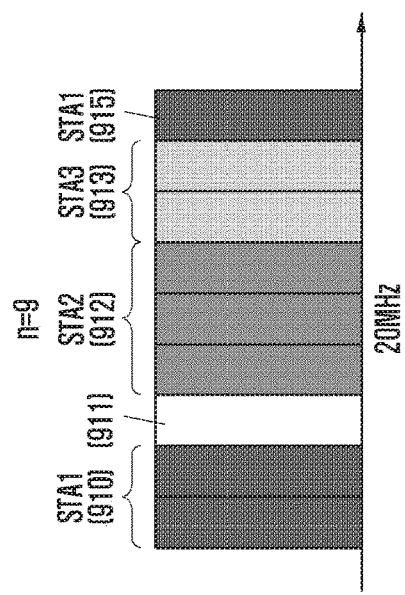
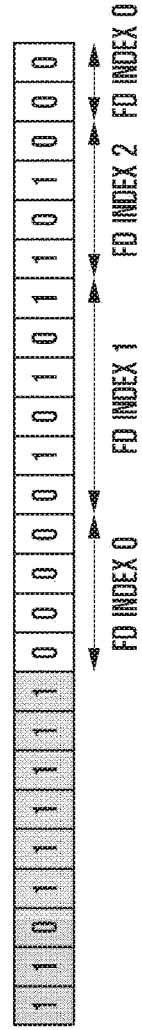
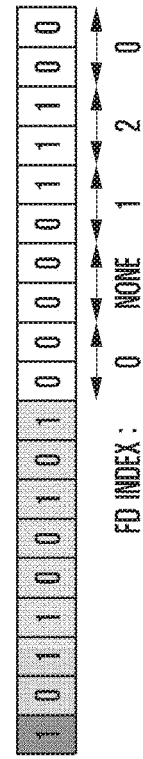
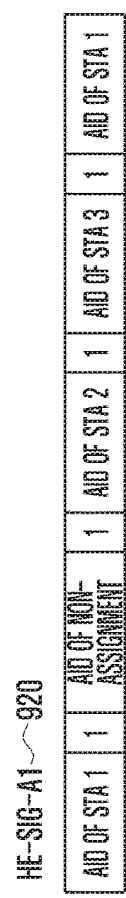
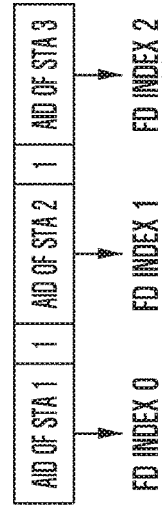
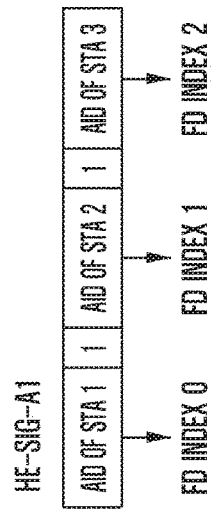

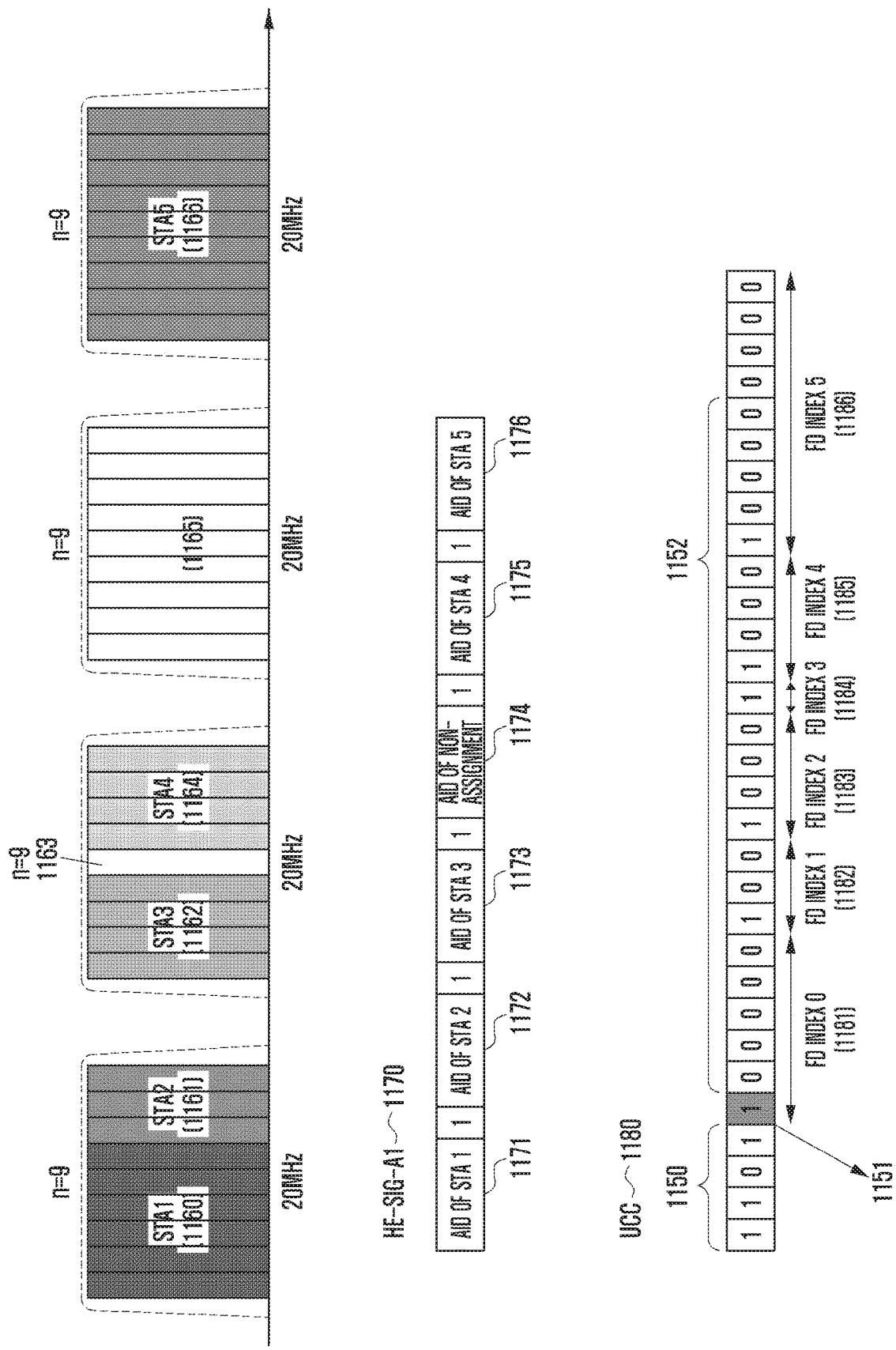

METHOD AND APPARATUS FOR ALLOCATING RESOURCES FOR MULTIPLE USERS IN WIRELESS LAN SYSTEM

TECHNICAL FIELD

The present invention relates to a wireless local area network (wireless LAN, WLAN) and, more particularly, to a method and apparatus for allocating resources for multiple users in a wireless LAN system.

BACKGROUND

The Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, machine-to-machine (M2M) or machine type communication (MTC) are under development.

In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

In addition, WLAN technology may be utilized for these various IoT technologies.

SUMMARY

To efficiently utilize the OFMDA technology in the WLAN (IEEE 802.11), resource allocation for multiple users should be performed for each physical layer convergence protocol (PLCP) protocol data unit (PDU) (hereinafter, referred to as "PPDU"). However, since efficient indication information for resource allocation to multiple users is not included in the related art, it is difficult to effectively utilize the OFDMA technology for transmitting the payload in the related art.

In accordance with an aspect of the present invention, there is provided a method for a transmitter to allocate resources to a receiver in a wireless local area network system. The method may include: generating a protocol data unit (PDU) including control information on resource allocation and a payload; and transmitting the PDU to the receiver, wherein the receiver decodes the payload based on the control information, and the control information includes a first field and a second field.

In accordance with another aspect of the present invention, there is provided a method for a receiver to receive a payload from a transmitter in a wireless local area network system. The method may include: receiving a protocol data unit (PDU) including control information on resource allocation and a payload from the transmitter having generated the PDU; and decoding the payload based on the control information, wherein the control information includes a first field and a second field.

In accordance with another aspect of the present invention, there is provided a transmitter capable of allocating resources to a receiver in a wireless local area network system. The transmitter may include: a transceiver to send and receive a signal; and a controller to perform generating a protocol data unit (PDU) including control information on resource allocation and a payload, and controlling the transceiver to transmit the PDU to the receiver, wherein the receiver receives the payload based on the control information, and the control information includes a first field and a second field.

In accordance with another aspect of the present invention, there is provided a receiver capable of receiving a payload from a transmitter in a wireless local area network system. The receiver may include: a transceiver to send and receive a signal; and a controller to perform controlling the transceiver to receive a protocol data unit (PDU) including control information on resource allocation and a payload from the transmitter having generated the PDU, and controlling decoding of the payload based on the control information, wherein the control information includes a first field and a second field.

In a feature of the present invention, the method and apparatus for allocating resources to multiple users can efficiently allocate resources to multiple users using the OFDMA technology, thereby efficiently providing services to multiple users.

BRIEF DESCRIPTION OF THE DRAWINGS

FIG. 2B represents resource allocation of each user using the HE-SIG-A1 field.

FIG. 6 illustrates five UCC field structures proposed in the present invention.

FIG. 7 illustrates the UCC field structure according to proposal 1.

FIG. 8 illustrates the UCC field structure according to proposal 2.

FIG. 9 illustrates the UCC field structure according to proposal 3.

FIG. 11B illustrates the UCC field structure according to proposal 5 when the frequency band is allocated in units of 20 MHz with the presence of non-continuous allocation in a 20 MHz channel.

DETAILED DESCRIPTION

Figure 1:
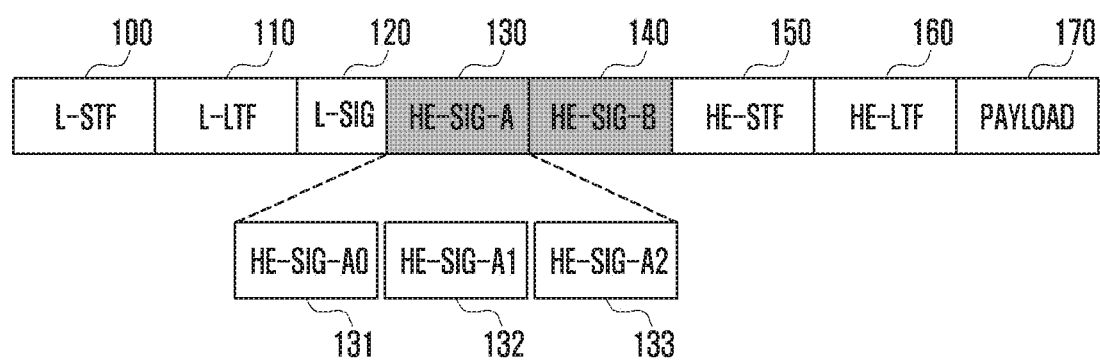
FIG. 1 illustrates the format of the downlink PPDU proposed in the present invention.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the present invention in the best manner. Accordingly, the meaning of specific terms or words used in the specification and the claims should be construed in accordance with the spirit of the present invention.

The following description of embodiments is mainly focused on wireless communication systems based on OFDM or OFDMA and the IEEE 802.11 standards in particular. However, it should be understood by those skilled in the art that the subject matter of the present invention is applicable to other communication systems having similar technical backgrounds and channel configurations without significant modifications departing from the scope of the present invention.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

A wireless LAN (WLAN) is a technology for connecting two or more devices through wireless signal transmission. Currently, most WLAN technologies are based on the IEEE (Institute of Electrical and Electronics Engineers) 802.11 standard. The IEEE 802.11 standard has evolved into 802.11b, 802.11a, 802.11g, 802.11n and 802.11ac amendments, and can now support a transmission rate of up to 1 Gbps using orthogonal frequency-division multiplexing (OFDM).

In the legacy 802.11ac WLAN standard, data can be simultaneously transmitted to a plurality of users using a multi-user multi-input multi-output (MU-MIMO) scheme. However, the existing WLAN system mainly supports one-to-one communication and suffers degradation of reception performance in a region where users are concentrated. To solve this problem, in the next-generation WLAN standard 802.11ax, not only MU-MIMO but also orthogonal frequency division multiple access (OFDMA) is applied to provide some of available subcarriers to each user, realizing multiple access. As such, it is expected that the next-generation WLAN system will be able to effectively support communication in dense and outdoor environments.

To efficiently utilize the OFMDA technology, resource allocation for multiple users should be performed for each physical layer convergence protocol (PLCP) protocol data unit (PDU) (referred to as "PPDU"). However, since efficient indication information for resource allocation to multiple users is not included in the related art, it is difficult to effectively utilize the OFDMA technology for transmitting the payload in the related art.

FIG. 1 illustrates the format of the downlink PPDU proposed in the present invention.

As shown in FIG. 1, the PPDU may be composed of L-STF (non-HT short training field) 100, L-LTF (non-HT long training field) 110, L-SIG (non-HT signal field) 120, HE-SIG-A (high efficiency signal A field) 130, HE-SIG-B (high efficiency signal B field) 140, HE-STF (high efficiency short training field) 150, HE-LTF (high efficiency long training field) 160, and payload 170. Here, HE-SIG-A may be composed of HE-SIG-A0 131, HE-SIG-A1 132, and HE-SIG-A2 133.

HE-SIG-A may store general signaling information such as bandwidth and basic service set (BSS), and downlink resource allocation related information for utilizing OFDMA and MU-MIMO, and is a field commonly received by all users since it is replicated every 20 MHz band (may be used interchangeably with a 20 MHz channel). HE-SIG-A may have a variable length because it includes multiuser related information.

HE-SIG-B is a field that stores a signal composed only of information of users assigned to a single band for each 20 MHz band. HE-SIG-B is transmitted in a frequency multiplexed manner for efficient transmission of signaling information and its contents change every 20 MHz.

One field of FIG. 1 may be omitted or a new field may be added. The name of a field may be changed. The field proposed in the present invention may be implemented as an addition to those fields of the related art. In addition, the contents of the field proposed in the present invention may be accommodated in an existing field or in a newly defined field.

Next, a detailed description is given of HE-SIG-A0, HE-SIG-A1 and HE-SIG-A2.

HE-SIG-A0 has a fixed length of 24 bits and stores information always included in the PPDU regardless of whether the PPDU is transmitted to one user or to multiple users. HE-SIG-A0 is composed of subfields regarding bandwidth (BW) of 2 bits, BSS identifier (BSS ID) of 6 bits, MCS (modulation and coding scheme) of 2 bits for HE-SIG-A1/A2/B, CP (cyclic prefix) length of 2 bits for HE-SIG-A1/A2/B, number of HE-SIG-A1 symbols, tail, and CRC (cyclic redundancy check). HE-SIG-A0 may serve to distinguish the newly proposed high-efficiency (HE) PPDU from the legacy PPDU. Particularly, among the subfields of HE-SIG-A0, the number of HE-SIG-A1 symbols indicates the number of symbols included in HE-SIG-A1. Thereby, the user having received the PPDU may know whether the PPDU is for a single user or for multiple users. If the number of HE-SIG-A1 symbols is 0, this indicates that the corresponding PPDU is for a single user. In this case, the fields HE-SIG-A1 and HE-SIG-A2 for multiple users are not transmitted.

When the PPDU is for multiple users, HE-SIG-A1 and HE-SIG-A2 are transmitted and HE-SIG-A1 includes association ID (AID) information of the user to receive data through the PPDU. HE-SIG-A2 includes a user channel configuration (UCC) field, which indicates resource allocation information based on OFDMA. The lengths of HE-SIG-A1 and HE-SIG-A2 are variable.

Figure 2A:
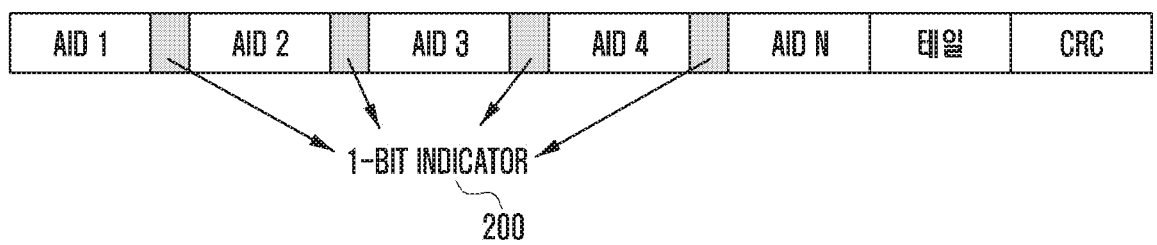
FIG. 2A illustrates the structure of the HE-SIG-A1 field.

FIG. 2A illustrates the structure of the HE-SIG-A1 field.

As shown in FIG. 2A, HE-SIG-A1 includes 1-bit indicators 200 between AID information of users to receive data through the PPDU, a tail, and a CRC. The 1-bit indicator indicates whether the immediately following AID is subject to resource allocation for MU-MIMO. Here, if the 1-bit indicator is 0, this may indicate that the corresponding user receives resource allocation for MU-MIMO; and if the 1 bit indicator is 1, this may indicate that the corresponding user does not receive resource allocation for MU-MIMO, or vice versa.

FIG. 2B represents resource allocation of each user using the HE-SIG-A1 field.

In FIG. 2B, the channel index assignment includes frequency division indexes ([0], [1], [2] and [3]) for utilizing OFDMA, and up to 4 users may be assigned to one frequency division index for data reception using MU-MIMO. When the 1-bit indicator set to 0 indicates that the corresponding user receives resource allocation for MU-MIMO and the 1 bit indicator set to 1 indicates that the corresponding user does not receive resource allocation for MU-MIMO, the value of 0 means that the adjacent AID is assigned to the same frequency division index and the value of 1 means that the adjacent AID is assigned to a different frequency division index.

As such, when AID 1 is located at multi-user index (MU) [0] of frequency division index [0], as the 1-bit indicator set to 0 after AID 1 means that AID 2 receives resource allocation for MU-MIMO, AID 2 is located at MU [2] of frequency division index [0] (the same frequency division index as that of AID 1). As the 1-bit indicator set to 1 after AID 2 means that AID 3 does not receive resource allocation for MU-MIMO, AID 3 is located at MU [0] of frequency division index [1] (different from the frequency division index of AID 1 and AID 2). In this way, the user having received the PPDU including HE-SIG-A1 can identify the user index and the frequency division index to which the user is assigned.

HE-SIG-B is a field that stores information specific to each user and consists of information of users assigned to each channel of 20 MHz wide and receiving data using OFDMA. That is, as HE-SIG-B of each 20 MHz channel is transmitted in a manner where different contents are frequency multiplexed, efficient transmission is possible compared to the existing signaling structure where information of the 20 MHz band is replicated and transmitted over the entire transmission band.

Figure 3:
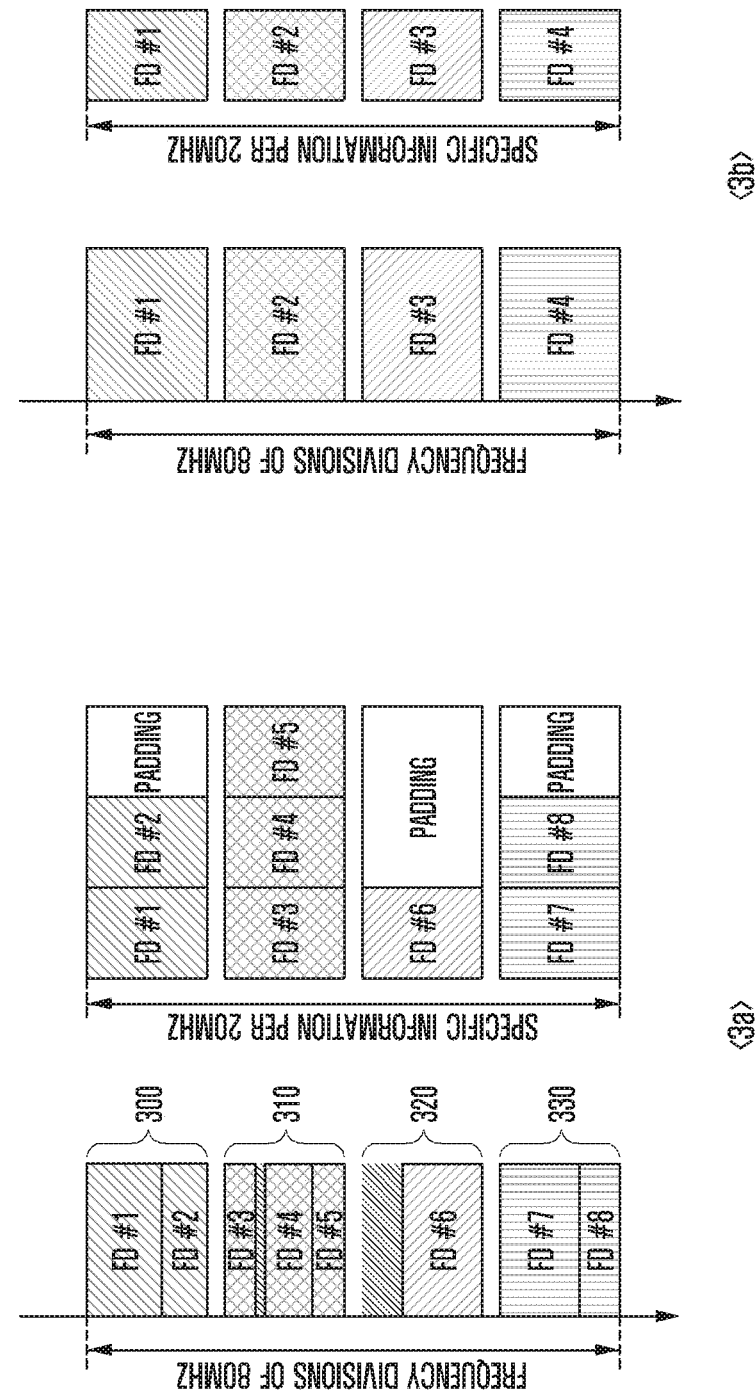
FIG. 3 depicts transmission of the HE-SIG-B field.

FIG. 3 depicts transmission of the HE-SIG-B field.

In part <3a> of FIG. 3, the 80 MHz bandwidth is divided into four 20 MHz frequency bands (channels) 300, 310, 320 and 330. Frequency division 1 (FD 1) and FD 2 are assigned to the 20 MHz channel 300, FD 3, FD 4 and FD 5 are assigned to the 20 MHz channel 310, FD 6 is assigned to the 20 MHz channel 320, and FD 7 and FD 8 are assigned to the 20 MHz channel 330. Each FD can be assigned to a single user or to multiple users using MU-MIMO. Here, HE-SIG-B for each 20 MHz channel transmits only information related to the frequency division assigned to the 20 MHz channel. For example, HE-SIG-B for the 20 MHz channel 300 transmits information related only to FD 1 and FD 2. At this time, padding may be included to match the length of HE-SIG-B. As shown in part <3b> of FIG. 3, when one FD is assigned to each of four 20 MHz channels, HE-SIG-B for each 20 MHz channel contains only information related to one FD.

Figure 4:
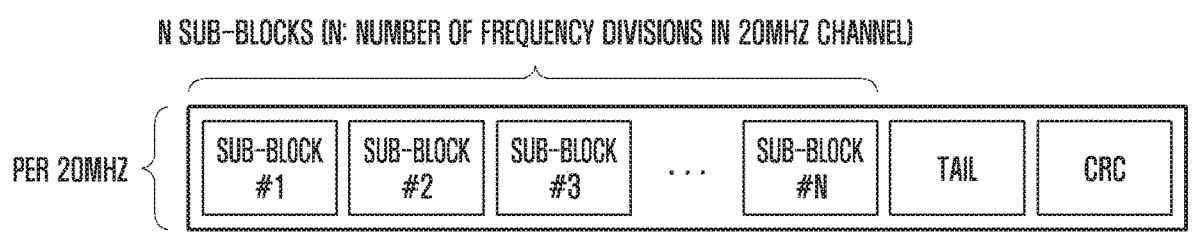
FIG. 4 illustrates the structure of the HE-SIG-B field for each 20 MHz channel.

FIG. 4 illustrates the structure of the HE-SIG-B field for each 20 MHz channel.

With reference to FIG. 4, HE-SIG-B is composed of N sub-blocks, a tail, and a CRC. Padding may be included to be fit to a given length. Here, N indicates the number of frequency divisions included in the 20 MHz channel, and each sub-block contains information about the corresponding frequency division.

Figure 5A:
FIG. 5A illustrates the sub-block configuration corresponding to frequency divisions for one user in the HE-SIG-B field.

FIG. 5A illustrates the sub-block configuration corresponding to frequency divisions for one user in the HE-SIG-B field.

As shown in FIG. 5A, the sub-block for one user is composed of beamforming indication of 1 bit indicating the use of beamforming for the user assigned to the corresponding frequency division, STBC of 1 bit indicating the use of space-time block coding (STBC), NSTS indicating the number of space time streams (2 bits for MU-MIMO or 3 bits for one user in the frequency division), coding of 1 bit, and MCS of 4 bits. Here, the total number of bits is 10, and the NTST, coding, and MCS fields constitute a user signaling.

Figure 5B:
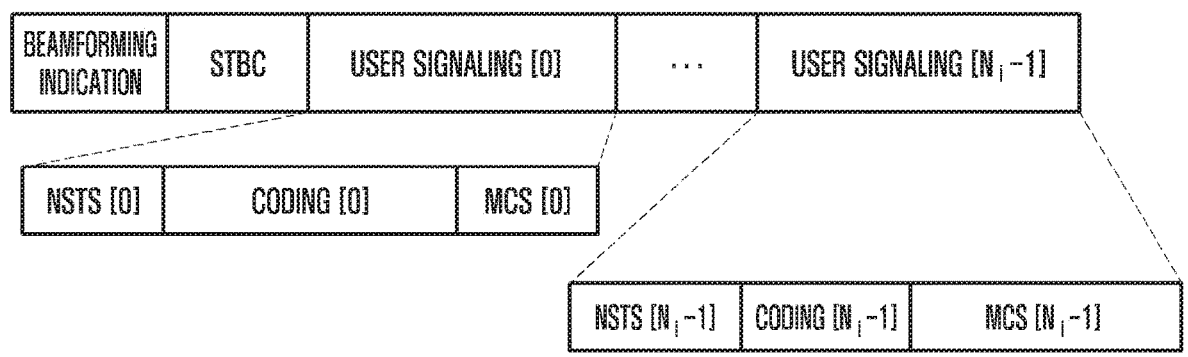
FIG. 5B illustrates the sub-block configuration corresponding to frequency divisions for multiple users in the HE-SIG-B field.

FIG. 5B illustrates the sub-block configuration corresponding to frequency divisions for multiple users in the HE-SIG-B field.

With reference to FIG. 5B, the sub-block for multiusers assigned to the corresponding frequency division and using MU-MIMO is composed of beamforming indication, STBC, and user signaling for each user (beamforming indication and STBC are the same as in the case of one user). In FIG. 5B, since the number of users is Ni, the number of user signaling is also Ni. Here, the number of HE-SIG-B symbols can be identified through HE-SIG-A. The number of bits in HE-SIG-B can be determined according to the number of frequency division indexes in a 20 MHz channel and whether multiple users are assigned to one frequency division index, and the number of symbols can be inferred based on a 20 MHz channel having the largest number of HE-SIG-B bits among the total transmission bandwidth.

HE-SIG-A2 includes fields for UCC indicating the 20 MHz channel to which the frequency division index given by HE-SIG-A1 is actually assigned on the frequency band, tail, and CRC. Hence, HE-SIG-A2 is unnecessary when users of the corresponding PPDU do not receive resource allocation for OFDMA or when the corresponding PPDU does not support OFDMA. For example, if every 1-bit indicator of HE-SIG-A1 is 0, as this means that the users of the corresponding PPDU do not receive resource allocation for OFDMA, HE-SIG-A2 may be not included in the corresponding PPDU.

When OFDMA is used to transmit information to multiple users, the UCC field proposed in the present invention is used to map the frequency division indexes of users and frequency divisions of the transmission band. Through the UCC field of HE-SIG-A2 in the PPDU, each user may identify the frequency division via which the information needed by the user is transmitted.

In the present invention, five UCC field structures are proposed.

FIG. 6 illustrates five UCC field structures proposed in the present invention. Here, the minimum resource block (min RB) is a minimum unit of frequency resources that can be allocated to use OFDMA.

With reference to FIG. 6, in proposal 1 (600), the UCC field includes subfields for resource allocation indication per min RB (601) and channel index mapping per indicated min RB (602).

In proposal 2 (610), the UCC field includes subfields for resource allocation indication for $1^{st}$ min RB (611), new user indication per min RB (612), and channel index mapping per indicated min RB (613).

In proposal 3 (620), the UCC field includes subfields for resource allocation indication for $1^{st}$ min RB (621), and new user indication per min RB (622).

In proposal 4 (630), the UCC field includes subfields for resource allocation indication per 20 MHz (631), and channel index mapping per indicated min RB (632).

In proposal 5 (640), the UCC field includes subfields for resource allocation indication per 20 MHz (641), resource allocation indication for $1^{st}$ min RB (642), and new user indication per min RB (643).

FIG. 7 illustrates the UCC field structure according to proposal 1.

In proposal 1, when the number of minimum RBs in the transmission bandwidth is n, the subfield for resource allocation indication per min RB indicates whether each minimum RB is allocated to the user. When one bit of the resource allocation indication per min RB subfield is set to 1, this indicates that the corresponding RB is allocated to the user; and when the bit thereof is set to 0, this indicates that the corresponding RB is not allocated to the user. Hence, the resource allocation indication per min RB subfield has a length of n bits. The subfield for channel index mapping per indicated min RB indicates the frequency division to which each min RB allocated by the resource allocation indication per min RB subfield (preceding subfield) is mapped. If the number of bits set to 1 in the resource allocation indication per min RB subfield is k (k<=n) and the number of frequency divisions indicated by HE-SIG-A1 is m, the channel index mapping per indicated min RB subfield has a length of k*ceil($\log_2$m).

In part <7a> of FIG. 7, the value of n is 9, and four minimum RBs 710 (from the left) are mapped to frequency division index (FD index) 0 (720) and five minimum RBs 711 are mapped to FD index 1 (721). In this case, as all the minimum RBs are allocated, the resource allocation indication per min RB subfield 700 contains nine 1's. As FD index 0 can be indicated by bit '0' and FD index 1 can be indicated by bit '1', the channel index mapping per indicated min RB subfield 701 contains four 0's (four minimum RBs mapped to FD index 0) and five 1's (five minimum RBs mapped to FD index 1).

In part <7b> of FIG. 7, the value of n is 9; and two minimum RBs 760 (from the left) are mapped to FD index 0, one minimum RB 761 is not allocated, one minimum RB 762 is mapped to FD index 1, two minimum RBs 763 are mapped to FD index 3, one minimum RB 764 is not allocated, and two minimum RBs 765 are mapped to FD index 2. In this case, the resource allocation indication per min RB subfield 750 is set to "110111011". Two 1's, one 0, one 1, two 1's, one 0, and two 1's (from the left) are indicated respectively by indicia 760, 761, 762, 763, 764 and 765. As the value of k is 7 and FD index 1 can be represented by "01", FD index 3 by "11", and FD index 2 by "10", the channel index mapping per indicated min RB subfield 751 contains two 2-bit values of 00 (two minimum RBs mapped to FD index 0), one 2-bit value of 01 (one minimum RBs mapped to FD index 1), two 2-bit values of 11 (two minimum RBs mapped to FD index 3), and two 2-bit values of 10 (two minimum RBs mapped to FD index 2).

FIG. 8 illustrates the UCC field structure according to proposal 2.

In proposal 2, the resource allocation indication for $1^{st}$ min RB subfield indicates whether the first minimum RB in the transmission bandwidth is assigned to the FD for usage by the user. The value of 1 indicates that the first minimum RB is assigned to the FD, and the value of 0 indicates that the first minimum RB is not assigned to the FD. In the new user indication per min RB subfield, each bit is set to 1 if the minimum RB corresponding to the bit is assigned to the FD different from that to which the preceding minimum RB is assigned, and is set to 0 if the minimum RB corresponding to the bit is assigned to the same FD as that to which the preceding minimum RB is assigned. If the minimum RB corresponding to one bit is not assigned for usage, the bit is set to 1 (considered as a change in FD assignment). The channel index mapping per indicated min RB subfield indicates the frequency division to which each allocated min RB is mapped as in the case of proposal 1. In proposal 2, it is necessary to inform about the case where the RD to which a specific minimum RB is assigned is different from the RD to which the preceding minimum RB is assigned. Hence, FD mappings are required for the number of bits set to 1 in the resource allocation indication for $1^{st}$ min RB subfield and the new user indication per min RB subfield. When the number of bits set to 1 in the resource allocation indication for $1^{st}$ min RB subfield and the new user indication per min RB subfield is k' and the number of FDs is m, the length of the channel index mapping per indicated min RB subfield is k'*ceil($\log_2$m). When a minimum RB is not allocated, the FD index corresponding to the preceding minimum RB may be replicated in the channel index mapping per indicated min RB subfield.

In part <8a> of FIG. 8, the value of n is 9, and four minimum RBs 810 (from the left) are mapped to FD index 0 (820) and five minimum RBs 811 are mapped to FD index 1 (821). In this case, as the first minimum RB is allocated, the resource allocation indication for $1^{st}$ min RB subfield 800 is set to 1. As FD assignment for the fifth minimum RB changes to FD index 2, the new user indication per min RB subfield 801 contains "00010000". In the new user indication per min RB subfield 801, the first bit (0) corresponds to the second minimum RB, the second bit (0) corresponds to the third minimum RB, and 1 after three 0's indicates that the FD index changes for the fifth minimum RB. As the FD index changes from 0 (821) to 1 (822), the channel index mapping per indicated min RB subfield 802 includes '0' indicating FD index 0 and '1' indicating FD index 1. The sum of the lengths of the resource allocation indication for $1^{st}$ min RB subfield 800 and the new user indication per min RB subfield 801 becomes n (i.e. 9).

In part <8b> of FIG. 8, the value of n is 9; and two minimum RBs 860 (from the left) are mapped to FD index 0, one minimum RB 861 is not allocated, one minimum RB 862 is mapped to FD index 1, two minimum RBs 863 are mapped to FD index 3, one minimum RB 864 is not allocated, and two minimum RBs 865 are mapped to FD index 2. In this case, as the first minimum RB is assigned to FD index 0, the resource allocation indication for $1^{st}$ min RB subfield 850 is set to 1. In the new user indication per min RB subfield 851, as FD assignment changes for the fourth, fifth and eighth minimum RBs, the third, fourth and seventh bits are set to 1; and as the third and seventh minimum RBs are not allocated, the second and sixth bits are set to 1. The channel index mapping per indicated min RB subfield 852 includes a 2-bit value of 00 indicating FD index 0 (870), a 2-bit value of 00 indicating preceding FD index 0 (871) for the unallocated minimum RB 861, a 2-bit value of 01 indicating FD index 1 (872), a 2-bit value of 11 indicating FD index 3 (873), a 2-bit value of 11 indicating preceding FD index 3 (874) for the unallocated minimum RB 864, and a 2-bit value of 10 indicating FD index 2 (875). The sum of the lengths of the resource allocation indication for $1^{st}$ min RB subfield 850 and the new user indication per min RB subfield 851 becomes n (i.e. 9).

According to proposals 1 and 2, non-continuous frequency allocation is possible in the 20 MHz band, and the order of FD indexes assigned for individual channels can be changed. Hence, it is possible to represent all possible resource assignments.

FIG. 9 illustrates the UCC field structure according to proposal 3.

According to proposal 3, the UCC field includes the resource allocation indication for $1^{st}$ min RB subfield and the new user indication per min RB subfield. The resource allocation indication for $1^{st}$ min RB subfield indicates whether the first minimum RB in the transmission bandwidth is assigned to the FD for usage by the user. The value of 1 indicates that the first minimum RB is assigned to the FD, and the value of 0 indicates that the first minimum RB is not assigned to the FD. In the new user indication per min RB subfield, each bit is set to 1 if the minimum RB corresponding to the bit is assigned to the FD different from that to which the preceding minimum RB is assigned, and is set to 0 if the minimum RB corresponding to the bit is assigned to the same FD as that to which the preceding minimum RB is assigned. If the minimum RB corresponding to one bit is not assigned for usage, the bit is set to 1 (considered as a change in FD assignment). Here, the sum of the lengths of the resource allocation indication for $1^{st}$ min RB subfield and the new user indication per min RB subfield becomes n (the number of minimum RBs in the transmission bandwidth).

To identify the mapping relationship between frequency divisions of the transmission band and the frequency division indexes of users, HE-SIG-A1 and the UCC field should be considered together. In the previous two UCC structures, the mapping relationship is identified only by the UCC field. In the UCC structure of proposal 3, FD index [0] of HE-SIG-A1 is mapped to the resource allocation indication for $1^{st}$ min RB subfield and the first bit set to 1 in the new user indication per min RB subfield, and FD index [k] is mapped to the $k^{th}$ bit set to 1. In addition, to enable discontinuous frequency allocation, HE-SIG-A1 is configured to include an AID corresponding to non-assignment. Considering the case where the frequency is re-assigned to the same user or FD index, it is necessary to configure HE-SIG-A1 so that the same AID can be repeatedly included.

In FIG. 9, the value of n is 9; and two minimum RBs 910 (from the left) are assigned to station (STA) 1, one minimum RB 911 is not assigned, three minimum RBs 912 are assigned to STA 2, two minimum RBs 913 are assigned to STA 3, and one minimum RB 915 is assigned to STA 1 again. In this case, HE-SIG-A2 (920) includes AID of STA 1 (921), AID indicating no-RB assignment (non-assignment) (922), AID of STA 2 (923), AID of STA 3 (924), and AID of STA 1 (925), and further includes 1-bit indicators for individual AIDs. In the UCC field 930, as the first minimum RB is assigned to STA 1, the resource allocation indication for $1^{st}$ min RB subfield 900 is set to 1. In the new user indication per min RB subfield 901, the first bit (0) corresponds to the second minimum RB, the second bit (0) corresponds to the third minimum RB. As STA assignment changes to STA 2 for the fourth minimum RB, STA 3 for the seventh minimum RBs, STA 1 for the ninth minimum RB, and non-assignment AID for the third minimum RB, the second, third, sixth and eighth bits are set to 1 in the new user indication per min RB subfield. The user having received the PPDU can find the AID of the new station by referring to HE-SIG-A1 when the bit of the new user indication per min RB subfield corresponding to a given minimum RB is 1.

Reference numeral 940 indicates a UCC field configuration representing the example of FIG. 9 according to proposal 1, and reference numeral 950 indicates a UCC field configuration representing the example of FIG. 9 according to proposal 2.

Figure 10:
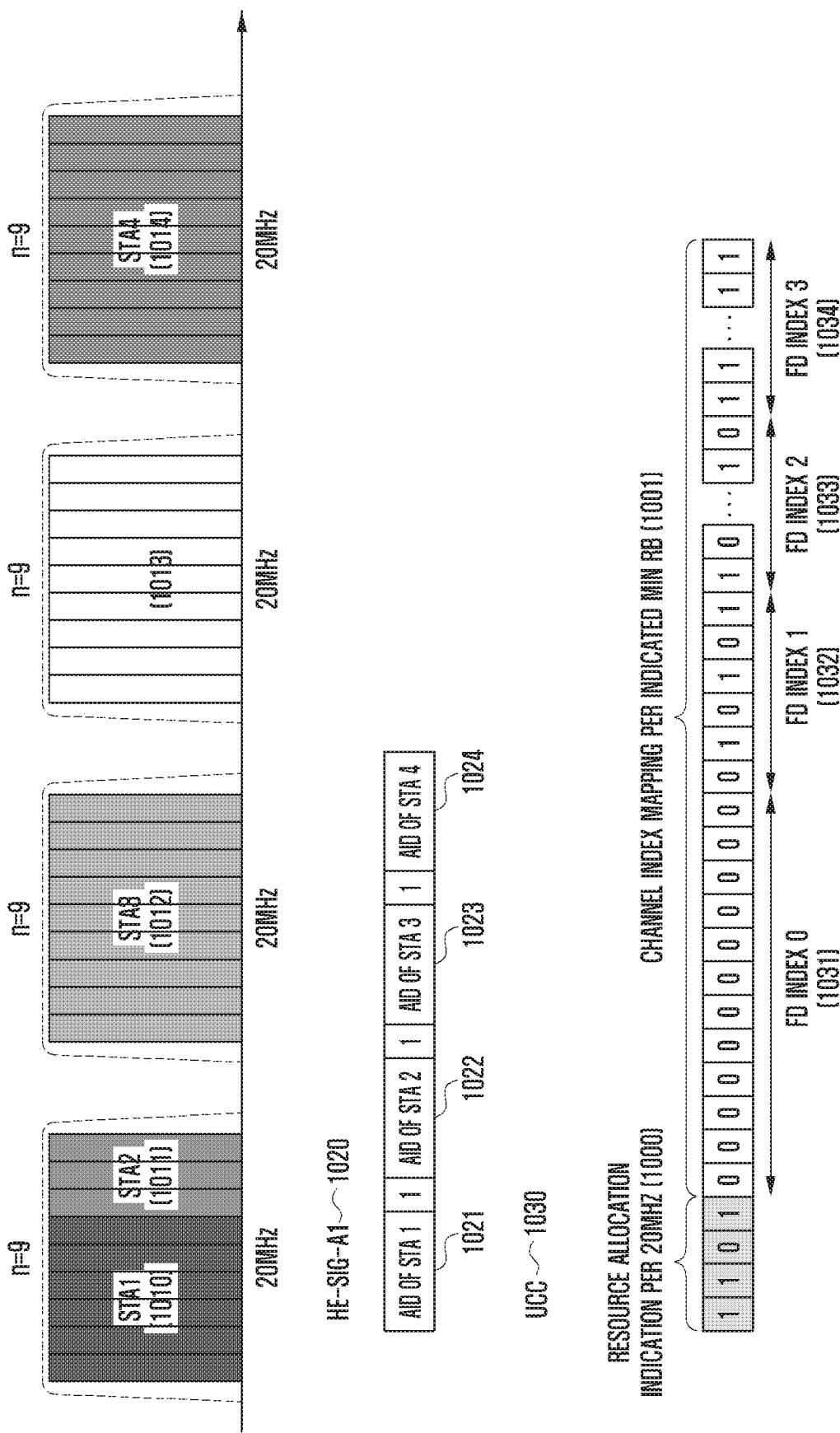
FIG. 10 illustrates the UCC field structure according to proposal 4 when the frequency band is allocated in units of 20 MHz.

FIG. 10 illustrates the UCC field structure according to proposal 4 when the frequency band is allocated in units of 20 MHz.

The UCC field of proposal 4 is similar to that of proposal 1, except that the resource allocation indication is given in units of 20 MHz instead of units of minimum RBs. In this case, discontinuous channel allocation is not possible within the 20 MHz band, but it is possible to significantly reduce the number of bits required to construct the UCC field. In proposal 4, the UCC field is composed of subfields for resource allocation indication per 20 MHz and channel index mapping per indicated min RB. Here, as in the case of proposal 1, the channel index mapping per indicated min RB subfield indicates the mapping relationship between minimum RBs and frequency division indexes. Assuming that the number of 20 MHz bands in the total bandwidth is b, the length of the resource allocation indication per 20 MHz subfield is b. When the number of minimum RBs in the 20 MHz band is n and the number of FD indexes is m, the length of the channel index mapping per indicated min RB subfield is n*b*ceil($\log_2$m).

In FIG. 10, in the first 20 MHz band of the total 80 MHz bandwidth (from the left), six minimum RBs 1010 are assigned to STA 1, and three minimum RBs 1011 are assigned to STA 2. In the second 20 MHz band, all nine minimum RBs 1012 are assigned to STA 3. The third 20 MHz band is not used. In the fourth 20 MHz band, all nine minimum RBs 1014 are assigned to STA 4. In this case, the resource allocation indication per 20 MHz subfield 1000 of the UCC field 1030 contains a bit value of "1101". The channel index mapping per indicated min RB subfield 1001 contains six 2-bit values of 00 (1031, indicating FD index 0 assigned to STA 1), three 2-bit values of 01 (indicating FD index 1 assigned to STA 2), nine 2-bit values of 10 (indicating FD index 2 assigned to STA 3), and nine 2-bit values of 11 (indicating FD index 3 assigned to STA 4). Here, in the HE-SIG-A1 field 1020, it is assumed that one FD index is assigned for one AID of STA.

Figure 11A:
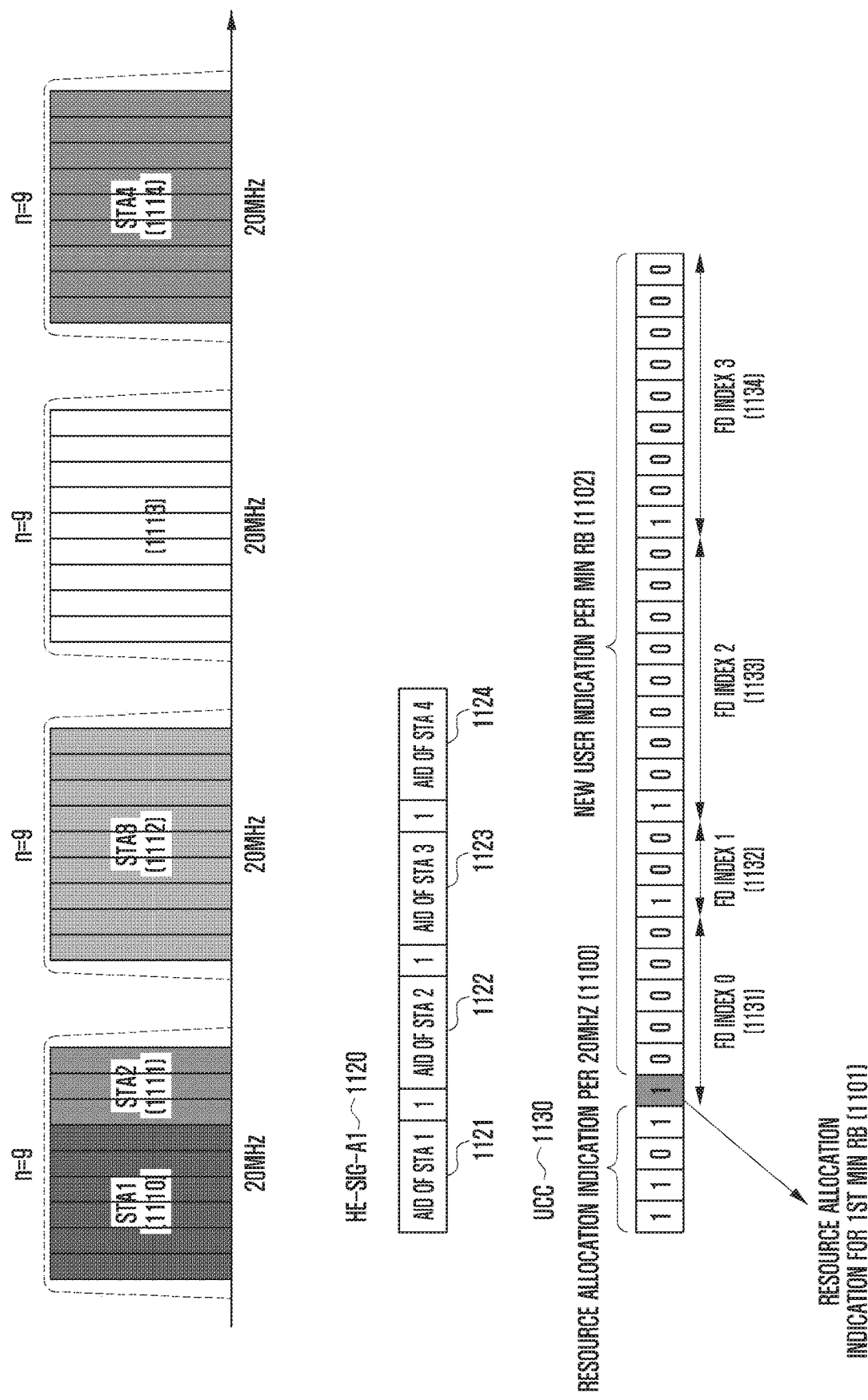
FIG. 11A illustrates the UCC field structure according to proposal 5 when the frequency band is allocated in units of 20 MHz without the presence of non-continuous allocation in a 20 MHz channel.

FIG. 11A illustrates the UCC field structure according to proposal 5 when the frequency band is allocated in units of 20 MHz.

In proposal 5, the UCC field is composed of subfields for resource allocation indication per 20 MHz, resource allocation indication for $1^{st}$ min RB, and new user indication per min RB. The resource allocation indication per 20 MHz subfield indicates resource allocation in units of 20 MHz. The resource allocation indication for $1^{st}$ min RB subfield and the new user indication per min RB subfield are used in the same way as in proposal 3 for those 20 MHz bands to which resource allocation is made. Assuming that the number of 20 MHz bands in the total bandwidth is b, the length of the resource allocation indication per 20 MHz subfield is b. When the number of minimum RBs in the 20 MHz band is n, the sum of the lengths of the resource allocation indication for $1^{st}$ min RB subfield and the new user indication per min RB subfield is n*b. Assuming that there is no discontinuous allocation in the 20 MHz channel, HE-SIG-A1 does not include AIDs corresponding to non-assignment or duplicate AIDs.

FIG. 11A illustrates the UCC field structure according to proposal 5 when the frequency band is allocated in units of 20 MHz without non-continuous allocation in a 20 MHz channel.

In FIG. 11A, the value of n is 9 and the value of b is 4. In the first 20 MHz band of the total 80 MHz bandwidth (from the left), six minimum RBs 1110 are assigned to STA 1, and three minimum RBs 1111 are assigned to STA 2. In the second 20 MHz band, all nine minimum RBs 1112 are assigned to STA 3. The third 20 MHz band is not used. In the fourth 20 MHz band, all nine minimum RBs 1114 are assigned to STA 4. In this case, the resource allocation indication per 20 MHz subfield 1100 of the UCC field 1130 contains a bit value of "1101". As the first minimum RB of the first 20 MHz band is assigned, the resource allocation indication for $1^{st}$ min RB subfield 1101 is set to 1. The new user indication per min RB subfield 1102 indicates a new user for the resource allocation indication per 20 MHz subfield. In the new user indication per min RB subfield, as STA assignment changes from STA 1 to STA 2 for the seventh minimum RB of the first 20 MHz channel, the sixth bit is set to 1. As STA assignment changes from STA 2 to STA 3 for the first minimum RB of the second 20 MHz channel (tenth minimum RB), the ninth bit is set to 1. As the third 20 MHz channel is not assigned, it is not indicated by the new user indication per min RB subfield. As STA assignment changes to STA 4 for the first minimum RB of the fourth 20 MHz channel (twenty-eighth minimum RB), the twenty-seventh bit is set to 1. The remaining bits are set to 0. Here, the sum of the lengths of the resource allocation indication for $1^{st}$ min RB subfield and the new user indication per min RB subfield is 36 bits. Here, in the HE-SIG-A1 field 1120, it is assumed that one FD index is assigned for one AID of STA.

FIG. 11B illustrates the UCC field structure according to proposal 5 when the frequency band is allocated in units of 20 MHz with non-continuous allocation in a 20 MHz channel.

In FIG. 11B, HE-SIG-A1 1170 may include duplicate AIDs or non-assignment AID. To represent non-continuous allocation in a frequency band, the new user indication per min RB subfield of the UCC field 1180 may include a bit set to 1 (1184) indicating non-assignment of a minimum RB (1163). As one FD index is assigned for one AID of STA in HE-SIG-A1, FD index 3 (1184) corresponds to non-assignment AID 1174 for the unassigned minimum RB 1163.

Proposals 4 and 5 support discontinuous resource allocation in units of 20 MHz. Discontinuous resource allocation is not supported by the legacy WLAN system. That is, if an access point (AP) and a user occupy a specific 20 MHz channel of the 80 MHz band, other APs and users could not use the entire 80 MHz band. To address this inefficiency, the next generation WLAN system considers a scenario in which resources are allocated discontinuously on a 20 MHz channel basis to allow other APs and users to exchange information using the remaining bands except for the already occupied 20 MHz channel. Enabling this flexible channel allocation can increase the overall system throughput.

Proposals 1 to 5 of the present invention for the UCC field structure can be used for resource allocation in the form disclosed in the description, and similar or multiple proposals may also be used in a mixed form. The resource allocation configuration proposed in the present invention can be implemented in a form that is added to the resource allocation configuration of the related art. In addition, the resource allocation configuration proposed in the present invention can be implemented in a form that is added to the existing or legacy fields.

Figure 12:
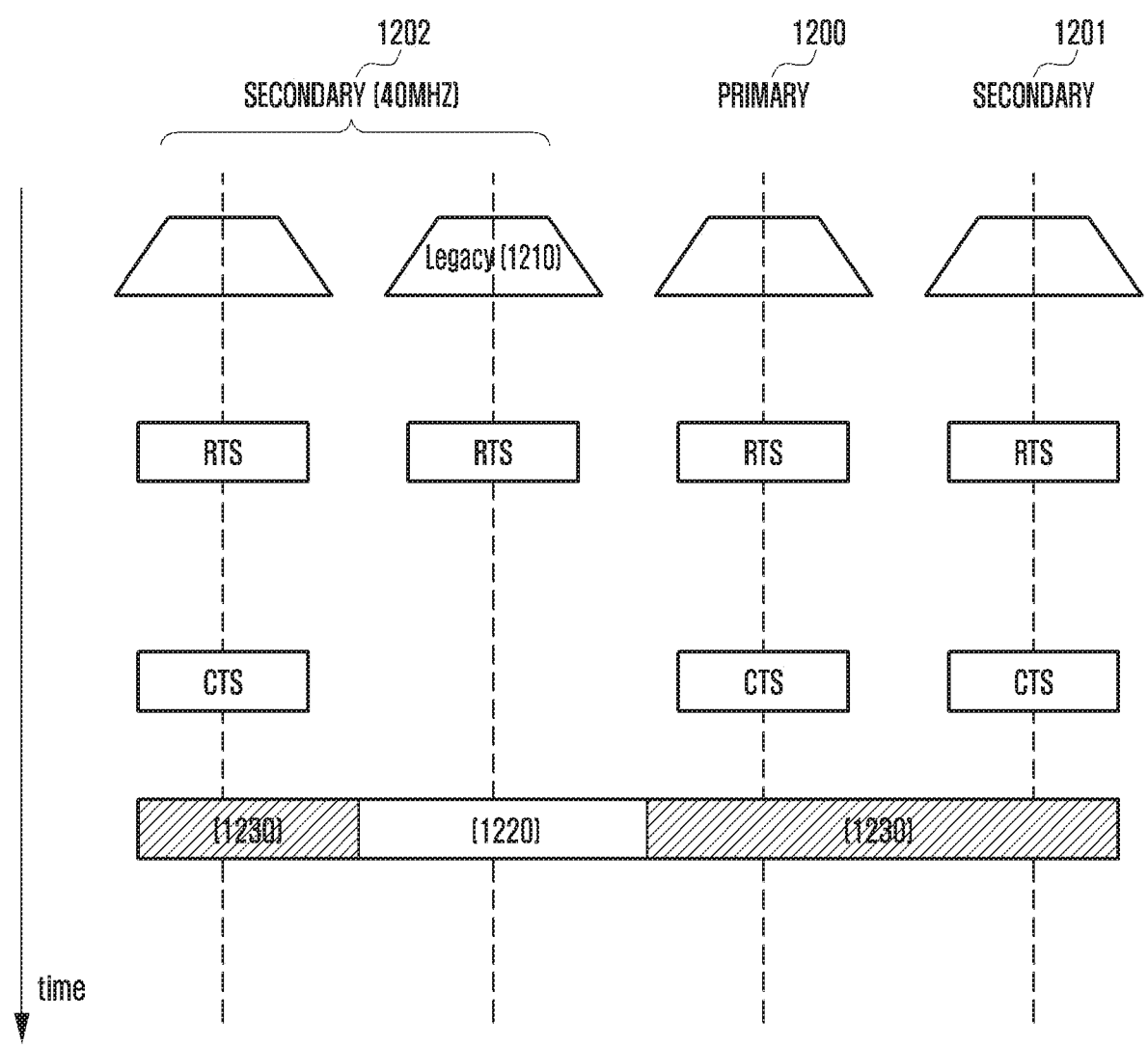
FIG. 12 illustrates performing communication using the remaining bands excluding the already occupied band.

FIG. 12 illustrates performing communication using the remaining bands excluding the already occupied band.

With reference to FIG. 12, the total 80 MHz band may be divided into a primary band (1200), a secondary band (1201), and a secondary band of 40 MHz (1202). When a legacy AP and a user occupy a specific 20 MHz band 1220, as the next-generation AP does not receive CTS (clear to send) through carrier sensing on an already occupied channel, the next-generation AP may be enabled to communicate using the remaining 60 MHz band 1230 without disturbing the communication between the legacy AP and the user. Proposals 4 and 5 described above are a signaling scheme that can improve the overall system throughput by enabling discontinuous resource allocation, and can significantly reduce signaling overhead by directing channel usage on a 20 MHz-channel basis.

Figure 13A:
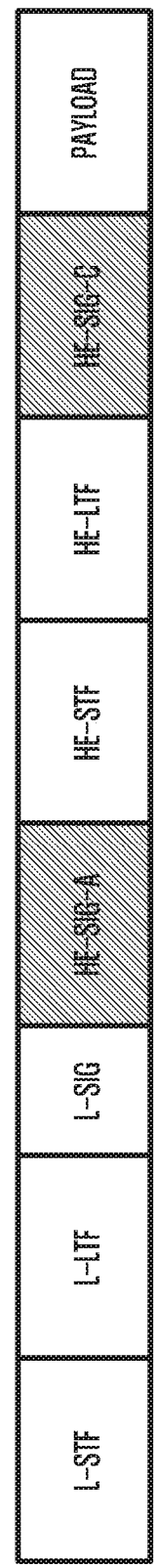
FIG. 13A illustrates the format of the uplink PPDU.

FIG. 13A illustrates the format of the uplink PPDU.

As shown in FIG. 13A, the uplink PPDU has a structure in which HE-SIG-B is omitted and HE-SIG-C is added before the payload in comparison to the downlink PPDU of FIG. 1. HE-SIG-C carries information on the users participating in uplink transmission through a given channel.

Figure 13B:
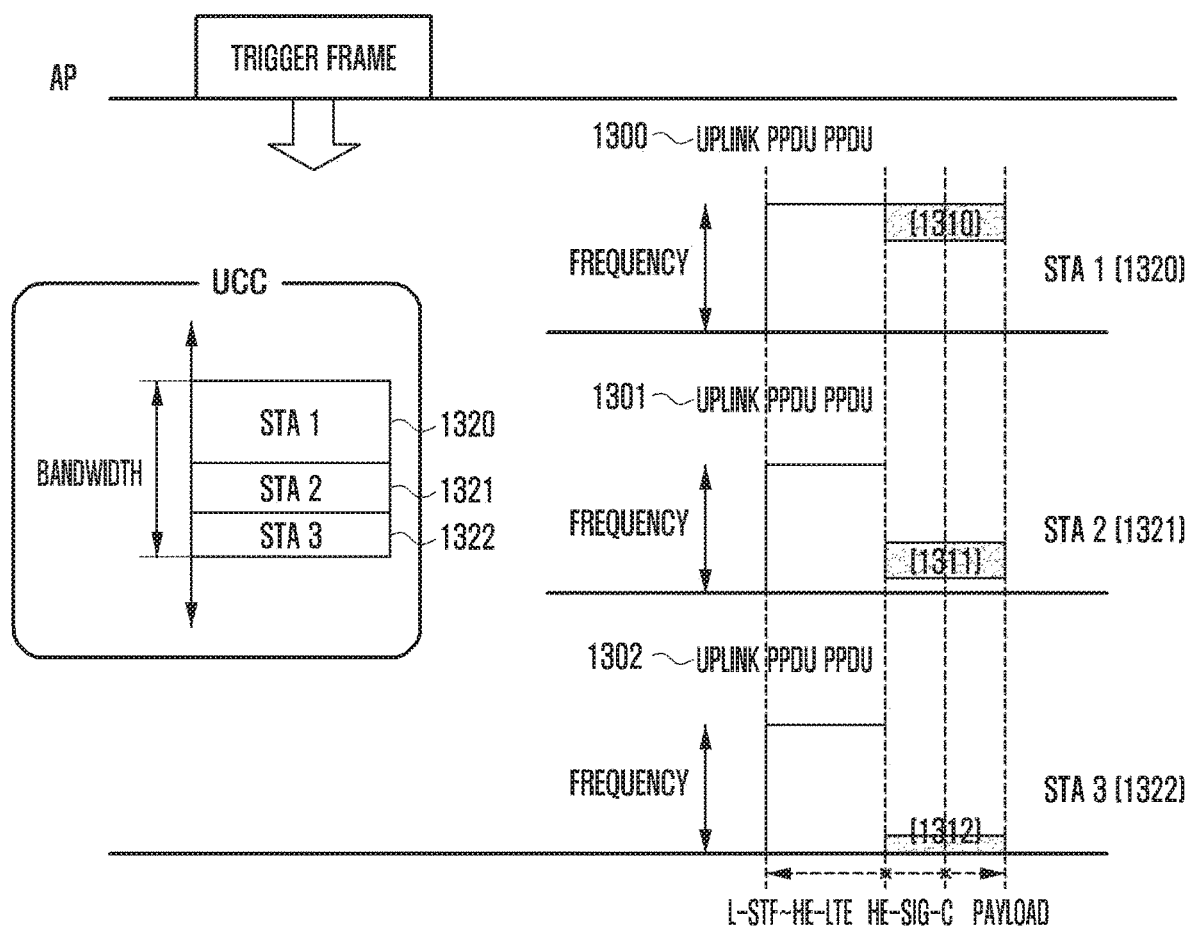
FIG. 13B depicts transmission of the HE-SIG-C field contained in the uplink PPDU.

FIG. 13B depicts transmission of the HE-SIG-C field contained in the uplink PPDU.

In FIG. 13B, uplink transmission is initiated when the user receives a downlink trigger frame from the AP. Here, the UCC field included in the PPDU to be sent to the AP notifies the AP of the frequency division to which each user is assigned, and users transmit the HE-SIG-C field and payload using only carriers of the band to which they are assigned. When generating the PPDU, the station pads the HE-SIG-C field and the payload with zero (0) for the carrier of the band assigned to other users. When STA 1 (1320), STA 2 (1321) and STA 3 (1322) are assigned in a 20 MHz bandwidth, each station transmits the uplink PPDU using the 20 MHz band and, in particular, transmits the HE-SIG-C field and the payload using the frequency band assigned to the station. That is, STA 1 transmits the HE-SIG-C field and the payload through the band 1310, STA 2 transmits the HE-SIG-C field and the payload through the band 1311, and STA 3 transmits the HE-SIG-C field and the payload through the band 1312. The HE-SIG-C field may include subfields for NTST, coding, and MCS for each user.

Figure 14:
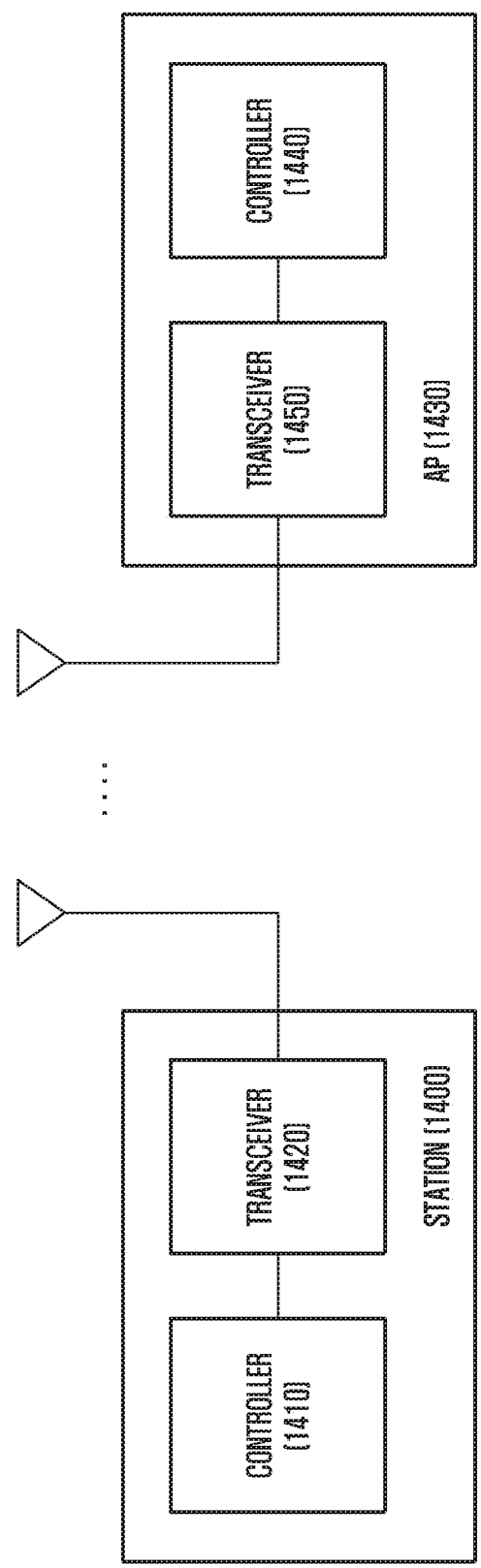
FIG. 14 is a block diagram of an apparatus supporting the present invention.

FIG. 14 is a block diagram of an apparatus supporting the present invention.

With reference to FIG. 14, the AP 1430 may include a transceiver 1450 and a controller 1440. The AP may be referred to as a transmitter or an access point. The transceiver 1450 may send and receive a signal to and from a station 1400 or the network. The controller 1440 may generate a PPDU composed of multiple fields and control transmitting the generated PPDU to the station. When generating the PPDU, the controller 1440 can follow the embodiment described in the present invention. The station 1400 may include a transceiver 1420 and a controller 1410. The station may be referred to as a receiver, a terminal, or a mobile station. The transceiver 1420 may send and receive a signal to and from the AP. The controller 1410 may control the transceiver 1420 to receive a PPDU from the AP and control decoding the PPDU to extract and decode the payload from the PPDU. When receiving and decoding the PPDU to extract the payload, the controller 1410 can follow the embodiment described in the present invention.

What is claimed is:

1. A method for a transmitter to allocate resources to a receiver in a wireless local area network system, the method comprising:

generating a protocol data unit (PDU) including control information on resource allocation and a payload; and transmitting the PDU to the receiver,
wherein the payload is decoded, by the receiver, based on the control information, and the control information includes a first field and a second field, and
wherein the first field is for transmitting common control information and includes at least 2 bit length bandwidth information, 6 bit length basic service set (BSS) identifier information, and information on a modulation and coding scheme (MCS) for the second field,
wherein the first field comprises a first subfield,
wherein the first field further comprises a second subfield and a third subfield, according to whether the PDU is transmitted for a single user,
wherein the first subfield includes information on a number of symbols of the second subfield, and
wherein, based on the information on the number of symbols of the second subfield indicating that the number of symbols of the second subfield is zero, the PDU is transmitted for the single user and the first field does not comprise the second subfield and the third subfield.

2. The method of claim 1, wherein the first field is repeatedly transmitted for every 20 MHz band.

3. The method of claim 1, wherein the second field includes user-specific information which includes information associated with beamforming, a number of space time streams, and an MCS.

4. A method for a receiver to receive a payload from a transmitter in a wireless local area network system, the method comprising:
receiving a protocol data unit (PDU) including control information on resource allocation and a payload from the transmitter having generated the PDU; and
decoding the payload based on the control information,
wherein the control information includes a first field and a second field, and
wherein the first field is for transmitting common control information and includes at least 2 bit length bandwidth information, 6 bit length basic service set (BSS) identifier information, and information on a modulation and coding scheme (MCS) for the second field,
wherein the first field comprises a first subfield,
wherein the first field further comprises a second subfield and a third subfield, according to whether the PDU is transmitted for a single user,
wherein the first subfield includes information on a number of symbols of the second subfield, and
wherein, based on the information on the number of symbols of the second subfield indicating that the number of symbols of the second subfield is zero, the PDU is transmitted for the single user and the first field does not comprise the second subfield and the third subfield.

5. The method of claim 4, wherein the first field is repeatedly transmitted for every 20 MHz band.

6. The method of claim 4, wherein the second field includes user-specific information which includes information associated with beamforming, a number of space time streams, and an MCS.

7. A transmitter capable of allocating resources to a receiver in a wireless local area network system, comprising:
a transceiver to send and receive a signal; and
a controller to perform generating a protocol data unit (PDU) including control information on resource allocation and a payload, and controlling the transceiver to transmit the PDU to the receiver,
wherein the payload is decoded, by the receiver, based on the control information,
wherein the control information includes a first field and a second field,
wherein the first field is for transmitting common control information and includes at least 2 bit length bandwidth information, 6 bit length basic service set (BSS) identifier information, and information on a modulation and coding scheme (MCS) for the second field,
wherein the first field comprises a first subfield,
wherein the first field further comprises a second subfield and a third subfield according to whether the PDU is transmitted for a single user,
wherein the first subfield includes information on a number of symbols of the second subfield, and
wherein, based on the information on the number of symbols of the second subfield indicating that the number of symbols of the second subfield is zero, the PDU is transmitted for the single user and the first field does not comprise the second subfield and the third subfield.

8. The transmitter of claim 7, wherein the first field is repeatedly transmitted for every 20 MHz band.

9. The transmitter of claim 7, wherein the second field stores user-specific information which includes information associated with beamforming, a number of space time streams, and an MCS.

10. A receiver capable of receiving a payload from a transmitter in a wireless local area network system, comprising:
a transceiver to send and receive a signal; and
a controller to perform controlling the transceiver to receive a protocol data unit (PDU) including control information on resource allocation and a payload from the transmitter having generated the PDU, and controlling decoding of the payload based on the control information,
wherein the control information includes a first field and a second field, and
wherein the first field is for transmitting common control information and includes at least 2 bit length bandwidth information, 6 bit length basic service set (BSS) identifier information, and information on a modulation and coding scheme (MCS) for the second field,
wherein the first field comprises a first subfield,
wherein the first field further comprises a second subfield and a third subfield according to whether the PDU is transmitted for a single user,
wherein the first subfield includes information on a number of symbols of the second subfield, and
wherein, based on the information on the number of symbols of the second subfield indicating that the number of symbols of the second subfield is zero, the PDU is transmitted for the single user and the first field does not comprise the second subfield and the third subfield.

11. The receiver of claim 10,
wherein the first field is repeatedly transmitted for every 20 MHz band, and
wherein the second field includes user-specific information which includes information associated with beamforming, a number of space time streams, and an MCS.

* * * * *